United States Patent [19]
Meyer

[11] Patent Number: 6,148,329
[45] Date of Patent: Nov. 14, 2000

[54] METHOD AND SYSTEM FOR MAINTAINING THE FORMAT OF MESSAGES IN A MESSAGING SYSTEM DATABASE

[75] Inventor: Daniel P. Meyer, Downingtown, Pa.

[73] Assignee: Unisys Corporation, Blue Bell, Pa.

[21] Appl. No.: 09/119,138

[22] Filed: Jul. 20, 1998

[51] Int. Cl.$^7$ ............................................. G06F 13/00
[52] U.S. Cl. ............................................................ 709/206
[58] Field of Search ..................... 364/DIG. 1, DIG. 2; 709/200, 206, 217

[56] References Cited

U.S. PATENT DOCUMENTS

| | | | |
|---|---|---|---|
| 4,612,416 | 9/1986 | Emerson et al. | 179/6.11 |
| 4,654,866 | 3/1987 | Böttle et al. | 379/54 |
| 5,029,199 | 7/1991 | Jones et al. | 379/89 |
| 5,133,004 | 7/1992 | Heileman, Jr. et al. | 379/67 |
| 5,138,710 | 8/1992 | Kruesi et al. | 395/575 |
| 5,193,110 | 3/1993 | Jones et al. | 379/94 |
| 5,323,450 | 6/1994 | Goldhagen et al. | 379/100 |
| 5,333,266 | 7/1994 | Boaz et al. | 395/200 |
| 5,384,829 | 1/1995 | Heileman, Jr. et al. | 379/67 |
| 5,493,606 | 2/1996 | Osder et al. | 379/67 |
| 5,497,373 | 3/1996 | Hulen et al. | 370/79 |
| 5,600,633 | 2/1997 | Jaisingh et al. | 370/277 |
| 5,604,803 | 2/1997 | Aziz | 380/25 |
| 5,608,786 | 3/1997 | Gordon | 379/100 |
| 5,630,060 | 5/1997 | Tang et al. | 395/200.01 |
| 5,633,916 | 5/1997 | Goldhagen et al. | 379/67 |
| 5,675,507 | 10/1997 | Bobo, II | 364/514 R |
| 5,699,105 | 12/1997 | Chen et al. | 348/7 |
| 5,701,316 | 12/1997 | Alferness et al. | 371/53 |
| 5,708,780 | 1/1998 | Levergood et al. | 395/200.12 |
| 5,710,918 | 1/1998 | Lagarde et al. | 395/610 |
| 5,712,903 | 1/1998 | Bartholomew et al. | 379/89 |
| 5,737,495 | 4/1998 | Adams et al. | 395/615 |
| 5,911,776 | 6/1999 | Guck | 709/217 |

FOREIGN PATENT DOCUMENTS

| | | |
|---|---|---|
| WO 96/37989 | 11/1996 | WIPO . |
| WO 97/09682 | 3/1997 | WIPO . |
| WO 97/23082 | 6/1997 | WIPO . |
| WO 97/32256 | 9/1997 | WIPO . |
| WO 97/40612 | 10/1997 | WIPO . |

*Primary Examiner*—Robert B. Harrell
*Attorney, Agent, or Firm*—Lise A. Rode; Mark T. Starr; Rocco L. Adornato

[57] ABSTRACT

A method for use in a messaging system having a database of stored messages, wherein the stored messages include or are associated with corresponding attributes, the desired format of which is subject to change over time, comprises the steps of determining whether a stored message is formatted in accordance with a current message format prescribed for use in the messaging system; and redelivering the stored message if it is not formatted in accordance with the current format. An effect of the redelivery is to update the format of the message to the current format.

4 Claims, 5 Drawing Sheets

METHOD AND SYSTEM FOR MAINTAINING THE FORMAT OF MESSAGES IN A MESSAGING SYSTEM DATABASE

FIELD OF THE INVENTION

The present invention relates generally to messaging systems, and more particularly to a Universal Messaging System providing integrated voice, data and fax messaging services. The invention could be used for all message types, although the presently preferred embodiment is used for e-mail messages only.

BACKGROUND OF THE INVENTION

Universal Messaging enables subscribers to realize the benefits of unified messaging, which consolidates the notification, presentation and management of voice, fax and e-mail messages. With Universal Messaging, a subscriber need only check a single notification device for new messages. Such notification may be provided, e.g., by an e-mail message, message waiting indicator light, stutter dial tone, pager and/or an automatic outdial phone call. Universal Messaging may also include consolidated message presentation. For example, instead of using a telephone handset to pick up voice messages, a fax machine to pick up fax messages, and a PC to pick up e-mail messages, a subscriber could process all of his or her messages with a telephone handset or a multimedia PC, or the like.

A problem encountered in messaging systems concerns the internal format of the stored messages. In particular, for a number of possible reasons, certain information associated with the stored messages (such as e-mail message attributes) may change. Such a change in the message format could be due to changes in messaging standards or features in a new release of the messaging software. The present invention addresses this problem by providing a process whereby the old or outdated internal information is deleted from the database and the internal information about the message is recreated as if it were being delivered for the first time, while leaving the messaging system available for subscriber access and delivery of new messages.

Further background information concerning the construction and operation of messaging systems, and particularly systems employing a Network Applications Platform (NAP) for interfacing a telephone network and network applications running on an enterprise server, may be found in the following patents and copending patent applications:

U.S. Pat. No. 5,133,004, Jul. 21, 1992, "Digital Computer Platform for Supporting Telephone Network Applications";

U.S. Pat. No. 5,138,710, Aug. 11, 1992, "Apparatus and Method for Providing Recoverability in Mass Storage Data Base Systems Without Audit Trail Mechanisms";

U.S. Pat. No. 5,384,829, Jan. 24, 1995, "Digital Computer Platform for Supporting Telephone Network Applications";

U.S. Pat. No. 5,323,450, Jun. 21, 1994, "Telephone Network Applications Platform for Supporting Facsimile Applications";

U.S. Pat. No. 5,494,606, Feb. 20, 1996, "Multi-Lingual Prompt Management System for a Network Applications Platform";

U.S. Pat. No. 5,633,916, May 27, 1997, "Universal Messaging Service Using Single Voice Grade Telephone Line Within a Client/Server Architecture";

U.S. patent application Ser. No. 08/944,924, filed Oct. 6, 1997, "Enhanced Multi-Lingual Prompt Management in a Voice Messaging System With Support for Speech Recognition"now U.S. Pat. No. 6,058,166.

U.S. patent application Ser. No. 08/964,744, filed Nov. 5, 1997, "Methods and Apparatus for Providing External Access to Executable Call Flows of a Network Application"; (attorney docket TN079);

U.S. patent application Ser. No. 08/987,571, filed Dec. 11, 1997, "Multiple Language Electronic Mail Notification of Received Voice and/or Fax Messages"(attorney docket TN091);

U.S. patent application Ser. No. 09/094,126, filed Jun. 9, 1998, titled "Universal Messaging System Providing Integrated Voice, Data and Fax Messaging Services to PC/Web-based Clients, Including a Session Manager for Maintaining a Session Between a Messaging Platform and the Web-based Clients"; (attorney docket TN094);

U.S. patent application Ser. No. 09/093,593, filed Jun. 9, 1998, titled "Universal Messaging System Providing Integrated Voice, Data and Fax Messaging Services to PC/Web-based Clients, Including a Content Manager for Receiving Information from Content Providers and Formatting the Same into Multimedia Containers for Distribution to Web-based Clients"; (attorney docket TN095);

U.S. patent application Ser. No. 09/094,266, filed Jun. 9, 1998, titled "Universal Messaging System Providing Integrated Voice, Data and Fax Messaging Services to PC/Web-based Clients, Including a Large Object Server for Efficiently Distributing Voice/Fax Messages to Web-based Clients"; (attorney docket TN096); and U.S. patent application Ser. No. 09/094,026, filed Jun. 9, 1998, "System and Method for Integrating Notification Functions of Two Messaging Systems in a Universal Messaging Solution"(attorney docket TN103).

SUMMARY OF THE INVENTION

The present invention provides a method and system for use in a messaging system having a database of stored messages. The stored messages include or are associated with corresponding attributes, and the desired format of the attributes is subject to change over time. The inventive method comprises the steps of determining whether a stored message is formatted in accordance with a current message format prescribed for use in the messaging system; and redelivering the stored message if the stored message is not formatted in accordance with the current format. According to the invention, an effect of the step of redelivering the stored message is to update the format of the message to the current format.

In one presently preferred embodiment of the invention, the method includes the steps of determining whether a specified message is to be delivered initially or redelivered; if the message is to be redelivered, retrieving a unique message identifier and original message delivery time from a message header associated with the message, and retrieving the message from a database; decoding the message to identify the various message attributes (e.g., an originator, recipient, subject and message body); and if the message is to be redelivered, updating the message header in the database, and updating the link to the message in a mailbox of the recipient.

Another embodiment of the invention provides a method for redelivery of messages having an associated message version number and attributes, for use in a messaging system comprising a folder and mailbox database for storing messages. This method comprises the steps of determining whether redelivery is to be carried out for a specific mailbox or folder; if redelivery is not to be carried out for a specific mailbox or folder, retrieving a first message from the database, ordered by version number; if redelivery is to be carried out for a specific mailbox or folder, locking the specific mailbox or folder such that the redelivery process will have exclusive access to it, and then retrieving a first message from the mailbox or folder, ordered by version number; determining whether redelivery is a being specifically requested, or forced, by the mail administrator; if redelivery is being forced, setting the message version to a number which is different from a current version; if redelivery is not being forced, determining whether the version of the message is equal to a current version; if the version of the message is not equal to the current version, preparing the database for message redelivery by deleting attributes associated with the message; and delivering the message.

Other features and advantages of the present invention are described below.

DETAILED DESCRIPTION OF PREFERRED EMBODIMENTS

A. Overview of Universal Messaging System

Figure 1:
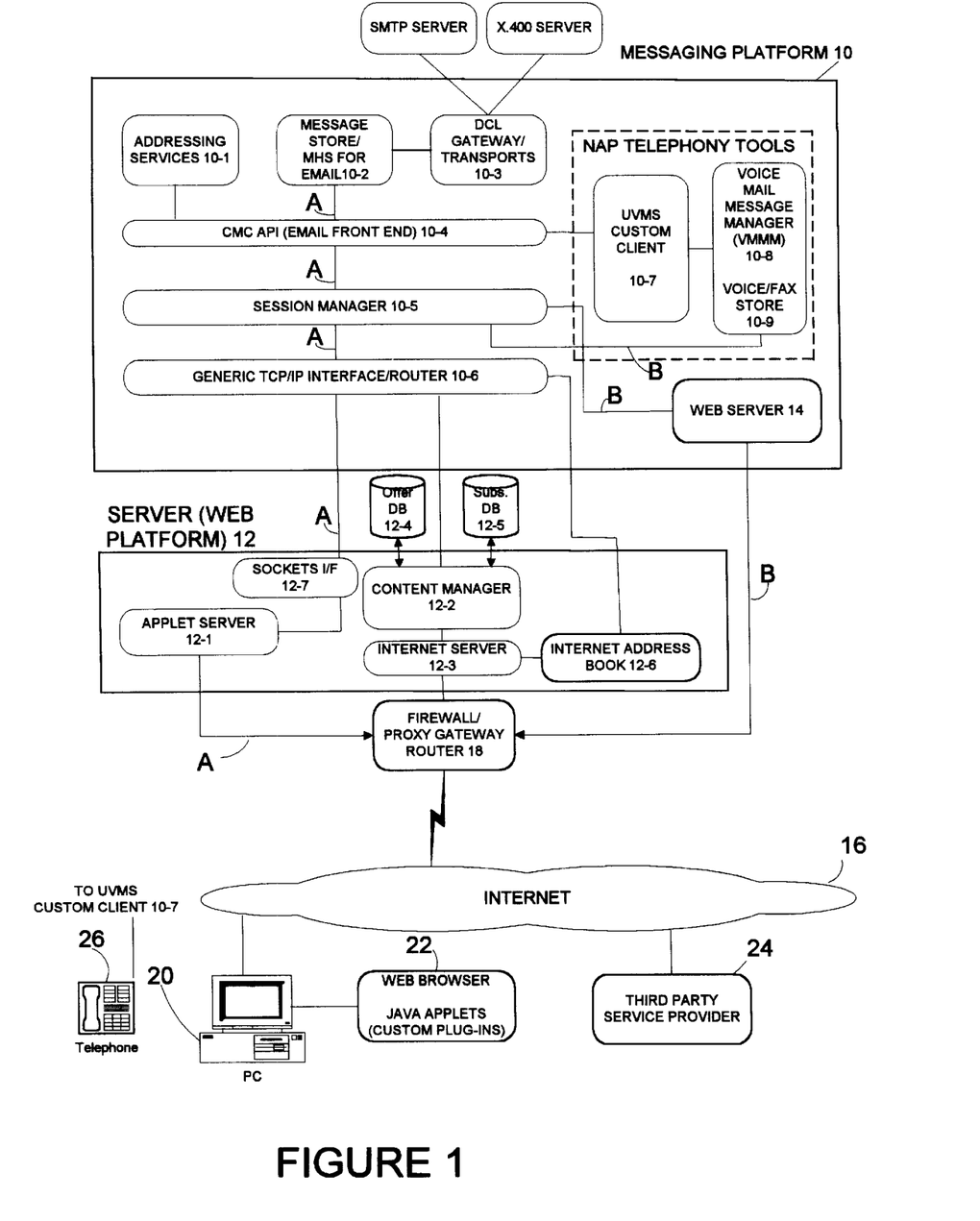
FIG. 1 schematically depicts one preferred embodiment of a Universal Messaging System in accordance with the present invention.

FIG. 1 schematically depicts one presently preferred embodiment of a Universal Messaging System including a messaging platform 10 (e.g., Unisys Corporation's Clearpath NX™ mainframe computer); a server complex 12 (e.g., an NT server), also referred to herein as a "Web platform"; a "Web server" 14 (e.g., Unisys's Atlas™ software), which is preferably a software component running on the messaging platform 10; a wide area communications network, such as the Internet, 16; a gateway/firewall 18; and a Web-based client comprising a remote PC-based client 20 and an associated Web browser 22. A third party service provider 24 may also be considered part of the overall system.

As shown in FIG. 1, the messaging platform 10 includes the following elements: addressing services object 10-1; e-mail message store object 10-2; transports service provider object 10-3 (including a gateway for interfacing to SMTP and X.400 servers); Common Messaging Calls (CMC) application programming interface (API) layer 10-4; Session Manager 10-5; generic TCP/IP interface/router 10-6; Universal Voice Messaging System Custom Client 10-7 and Voice Mail Message Manager (VMMM) (for voice and fax mail) 10-8; and voice/fax store 10-9. (Note that the CMC standard is defined by the X.400 API Association. CMC 1.0 defines a basic set of calls to inject and extract messages and files, and to access address information.)

The Web platform 12 includes an applet server 12-1 (e.g., for providing Java applets to the Web-based client); a Content Manager Application 12-2, i.e., an application designed to receive information from content providers, format information into multimedia containers and distribute these containers to the Universal Messaging System via CMC calls; and an NT based Internet server 12-3. Web platform 12 also includes or is operatively coupled to a first database (Offer Database) 12-4 and a second database (Subscription Database) 12-5, where "offer" refers to an e-mail based advertisement and "subscription" refers to "news" from a content provider. In addition, Web server 12 includes a communications object/address book 12-6 and a Sockets Interface 12-7.

As shown, the firewall/gateway 18 interfaces the applet server 12-1, Internet server 12-3 and Web server 14 to the Internet 16. Moreover, the applet server 12-1 is responsible for downloading and interface with the Universal Messaging desktop located on the client's Web browser 22. The applet server downloads (to the client PC 20) the Java applets required to provide an active desktop, and then communicates with the applets to provide the look and feel of the messaging desktop.

Figure 2:
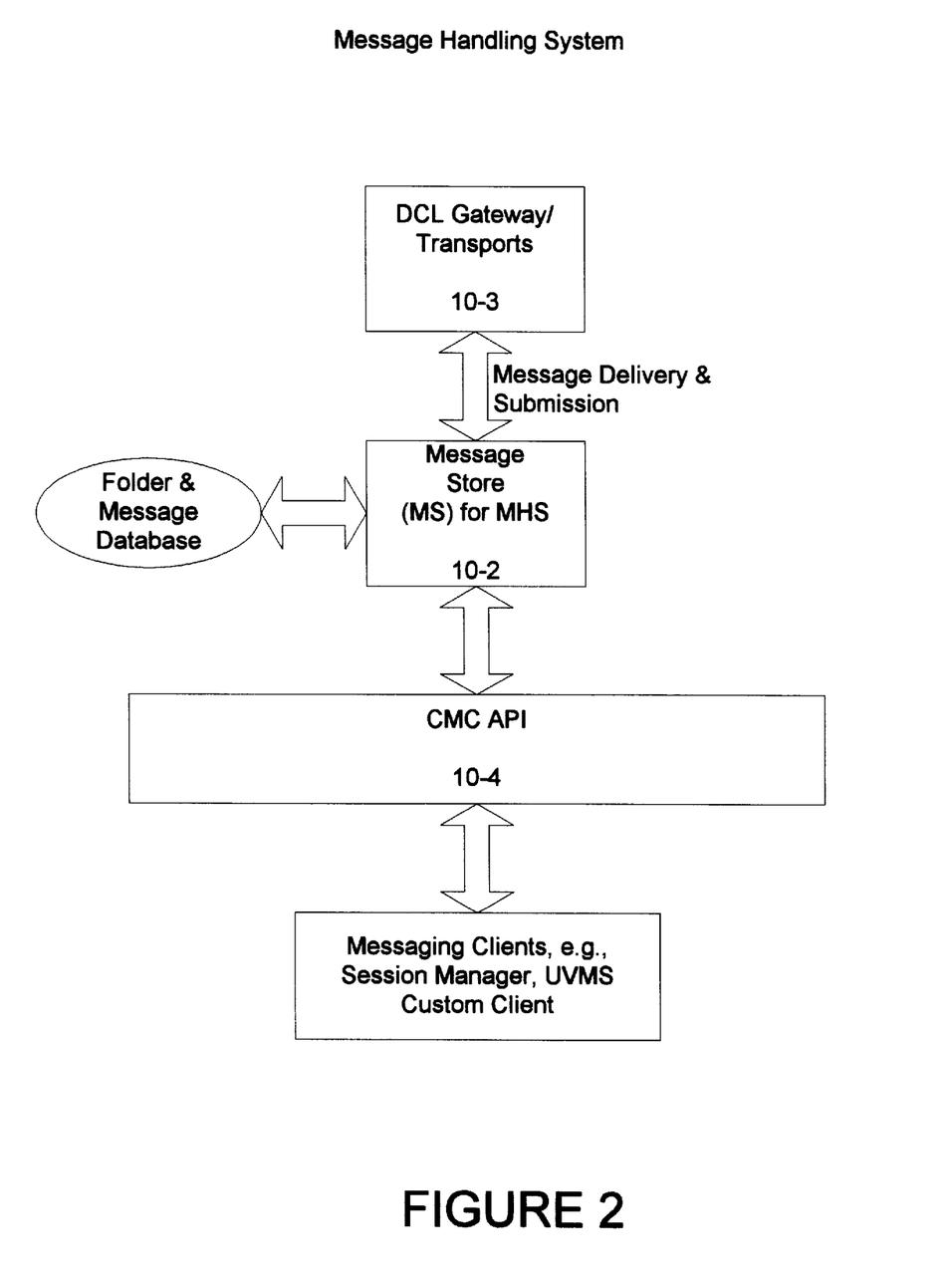
FIG. 2 schematically depicts a Message Handling System suitable for use in the Universal Messaging System of FIG. 1.

FIG. 2 is a simplified view of a Message Handling System (MHS) of the kind for which the present invention may be used. As shown, the Message Handling System comprises a reliable transport system and message transfer agent, such as the DCL gateway and transports object 10-3; a message store (MS) 10-2 and an associated folder and message database; a client messaging API 10-4; and one or more messaging clients communicating with the message store via the client messaging API. The message redelivery aspect of the present invention primarily relates to the content and format of the messages stored in the folder and message database. This is explained below in greater detail.

B. Message Redelivery

For each release of Universal Messaging, the information stored in the messaging database for messages may change, such as the identification and definition of new message attributes or redefinition of existing attributes. (The term attribute may be defined as: 1. In database management, a property inherent in an entity or associated with that entity for database purposes. 2. In network management, a property of a managed object that has a value. See http://www.its.bldrdoc.gov/fs-1037/dir-003/_0417.htm.) Previously received messages in the messaging database need to be updated to reflect the new and existing attribute definitions. Message redelivery addresses this need by providing a mechanism whereby the Message Store deletes the previously captured message attribute information and recreates it as if the messages were just being delivered for the first time. In accordance with the presently preferred embodiment of the invention, there are two mechanisms by which message redelivery is triggered: (1) autodection when the Message Store is initiated; and (2) administrator request. These two mechanisms are explained below.

There are two reasons redelivery is possible:

(1) a single copy of each message is maintained in the database for all recipients. The linkage between a client folder and a message is effected by maintaining a message record key (unique identifier) in the user folder instead of storing the message itself in the folder.

(2) the original message is retained in the messaging database in its entirety.

When redelivery is requested, the original messages are reprocessed by the appropriate transport service provider's decoding routines. As each message is processed, all of the old internal message-related information is removed from the database and replaced by the new attribute information created by the decoding routines.

For a single message, information that is common for all message recipients is stored with the message, e.g., the message submission time, the message delivery time, the message subject, the message originator, and message attachments.

Message information that is unique to each recipient of a message is stored separately from the message in each recipient's folder. Such information includes, e.g., entry status (which indicates the message has been read) and receipt status (which indicates a read receipt is required or has been generated). This information cannot be changed during redelivery, and thus the redelivery process makes no attempt to update the recipient's folder information.

In the following sections, an exemplary database management program and database design are explained. Next, exemplary autodetection and administrator initiated methods for triggering message redelivery in accordance with the present invention are described. Then, exemplary "message delivery with integrated redelivery" and message redelivery processes in accordance with the invention are described with reference to the flowcharts of FIGS. 3 and 4, respectively.

Database Management Software

The preferred database software is called "Data Management System II," or DMSII. DMSII is a database system that centralizes the management of information, such as the information stored in a messaging database. Database structures and relationships are described only once to the system. Programs can then add, update and retrieve data without concern for how the data is stored or organized.

A data set, like a file, is a collection of data records within the same structure. However, unlike a file, a data set can collect structures and items. For example, a data set can contain other data sets, sets and subsets, as well as data items. Sets and subsets allow for the access of the records of a data set in key order. This arrangement makes record access more efficient.

Through DMSII sets or subsets, one can order data set records in many different ways based on one or more keys. For example, different sets can order records of the same employee data set using employee names, salaries, or addresses as keys.

The sets, subsets and keys utilized in a given situation dictate the most efficient retrievals of data in a data set. To design the most efficient retrievals, one must know how information is retrieved. Because each set increases the expense of updating a database, a database should not contain all the sets and keys that represent all the ways records can be ordered. The user decides if the added set is worth the update and storage expense.

Database Design

Figure 2A:
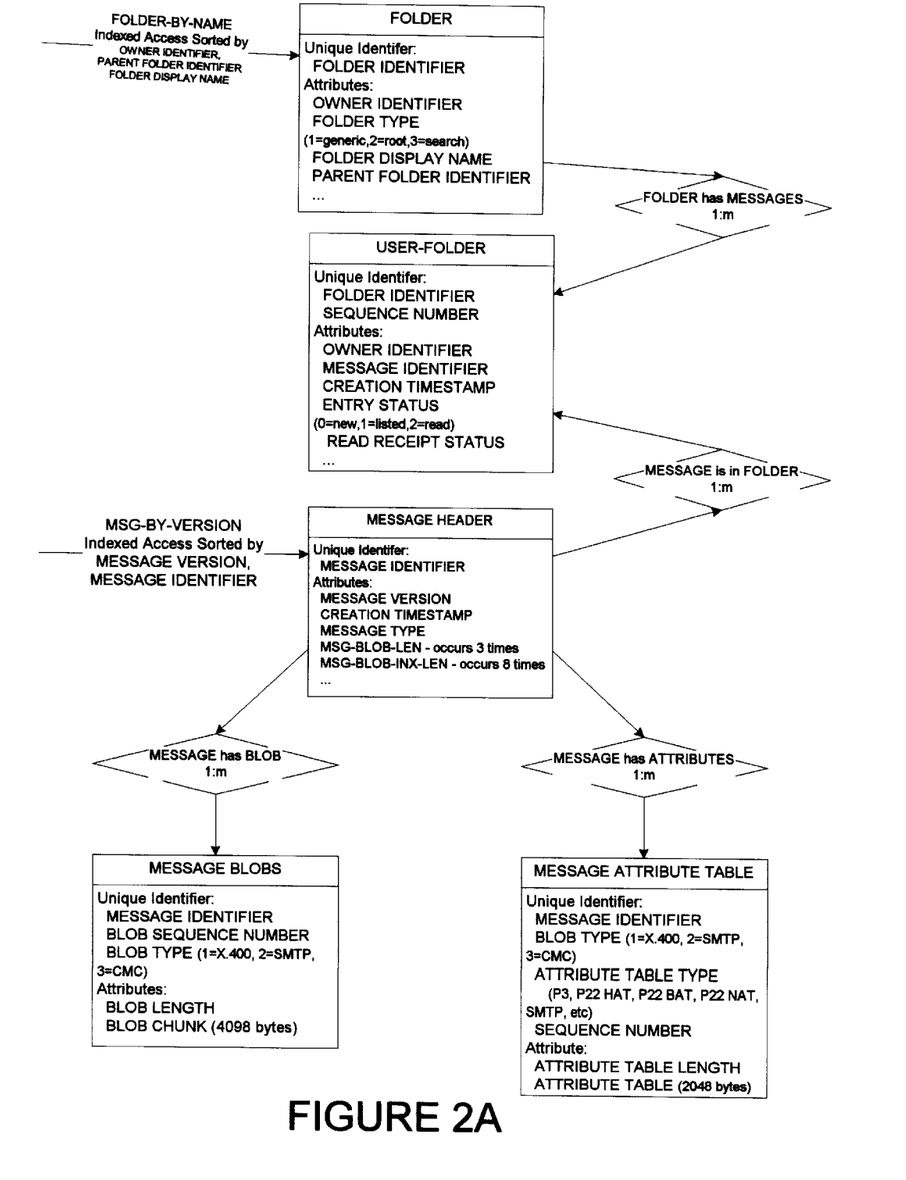
FIG. 2A illustrates an exemplary design for the messaging database.

The messaging database is designed to store messages in their original format as a BLOB (Binary Large OBject), whether it was received via SMTP protocols or X.400 protocols. As shown in FIG. 2A, each message is represented by a message header containing unique message identifier(s), a message format version, a creation timestamp, a message type (message or report), and the size and type of the message BLOB.

Various B-tree indices, which provide both random access and sequential (ordered) access to database tables, are maintained by the database management software in order to permit message headers to be retrieved using either the unique identifier(s) or by the message format version. In the case of the message version index, the primary key is the message format version, sorted ascending. This allows messages of an "older" message format version to be sequentially accessed first.

The message BLOBs are stored in 1024-byte blocks of data, i.e., a message is broken into a group of 1024-byte chunks of data. For example, a 7000-byte message would require 7 chunks, the last of which would only need 856 bytes. As shown in FIG. 2A, the BLOBs are stored in a separate database table with a sequence number providing logical ordering of a BLOB's chunks, which includes the following elements: unique message identifier, sequence number, BLOB type (X.400, SMTP, CMC, etc.), length of chunk, and the BLOB chunk.

Each message has many message attributes. The X.400 and SMTP standards (CCITT X.400/ISO EIC 10021 and RFC 822, respectively) describe these attributes. Examples of message attributes are message submission time, message priority (urgent, normal), the message originator, the message recipient(s), the message subject, and the message body parts.

In order to locate and retrieve the various message attributes within the BLOB, a series of attribute tables containing indices, or pointers, are created during the message delivery process and stored in the database. Each pointer identifies the attribute type (alpha, numeric, boolean, date, etc.), length of the attribute value, and an offset within the BLOB for locating the attribute value. For performance, the attribute value may sometimes be stored in the attribute tables instead of a BLOB pointer. The attribute tables are stored in a separate database table that contains: unique message identifier, sequential number, attribute table type (X.400 envelope, originator/recipient, body, etc.), and table of attribute pointers or attribute values.

The various messaging protocols support similar attributes, although the X.400 standard identifies many more attributes than the SMTP standard. As the standards are revised and improved, new attributes are added or existing attributes are refined. For example, RFC 1495 is the current standard that provides a mapping of the message attributes between the two standards protocols; it has gone through four (4) revisions since its original publication as RFC 987. These revisions may require changes to the format of the pointers in the attribute tables. Performance improvements may also dictate changes to the pointers in the attribute tables by storing values previously retrieved from the message BLOB in the attribute tables.

As changes are made to the format of the message attribute pointers, message BLOB table, or message headers, the message format version, maintained in the message header, is incremented by one. When the new MHS software is installed, all existing messages will preferably be converted to the new format. The need for the conversion is automatically recognized by the Message Store. The Message Store can initiate a message redelivery process that runs asynchronously as a background task to convert all existing messages to the new format.

Since the message redelivery process is performed asynchronously, the Message Store is immediately available for new message delivery and subscriber access to mailboxes and folders. As new messages are delivered into the database, they are stored in the new format and will not require conversion by the message redelivery function.

Autodetection

Each time the Message Store is initiated (see below), the manager task queues a worker request to check for any messages of an older version. A DMSII set, MSG-BY-VERSION, which provides sequential access to all the messages sorted by the message format version field, will be used by the worker to identify messages in the database that are not of the "current" version. The primary key of this set is the message version, and so an initial process, FIND MSG-BY-VERSION, will determine if there are any messages to be converted. If records are found, this "global" redelivery process steps through the records until it encounters a record that is of the current version. Since "global" redelivery can take a while, each time a subscriber logs on, the logon process checks for messages in the subscriber's mailbox that need to be redelivered. If none are found, the logon is allowed; but if a message is detected that requires redelivery, then the logon is rejected and a redelivery request is queued to redeliver only the messages in the subscriber's mailbox. If there are only a few messages in the subscriber's mailbox, the logon process can be reattempted in a matter of seconds.

Message Store initiation relates to the process of getting the Message Store running on the computer. The Message Store does not and cannot run by itself. When the Message Handling System (MHS) is started, the Message Transfer Agent (MTA) starts the various components, e.g., the Message Store. During the Message Store's startup processing, a manager task is initiated to control and monitor various database requests. The manager task initiates the asynchronous message redelivery function. In the normal case, message redelivery will not find any messages that need to be redelivered and will terminate.

As mentioned, the currently preferred implementation is of a manager task that starts up several asynchronous worker tasks. All Message Store function requests come into the manager. When a new request is made, the manager inserts the request into a queue of unprocessed requests. It then finds an idle worker (one that is not processing a request) and instructs that worker to wakeup and process the first queued request. By using a queuing mechanism, additional workers can be started up by the manager when the request workload increases. In other words, the manager starts, or spawns, an asynchronous task to perform the message redelivery process, as described below.

Administrator Initiated

The mail administrator can initiate message redelivery once the Message Store has started using an operator console command (REDELIVER). A global redelivery will be queued for the next available worker. An internal flag is set to indicate that this is a "forced" message redelivery.

Exemplary Message Delivery Process

A presently preferred implementation of a message delivery with integrated redelivery process in accordance with the present invention will now be described. In this example, depicted in FIG. 3, the system first determines whether this is a message redelivery process (step S1). If not, it calculates a new message delivery time (step S2). If so, it retrieves from the message header the unique message identifier and the original message delivery time (step S3).

Figure 3:
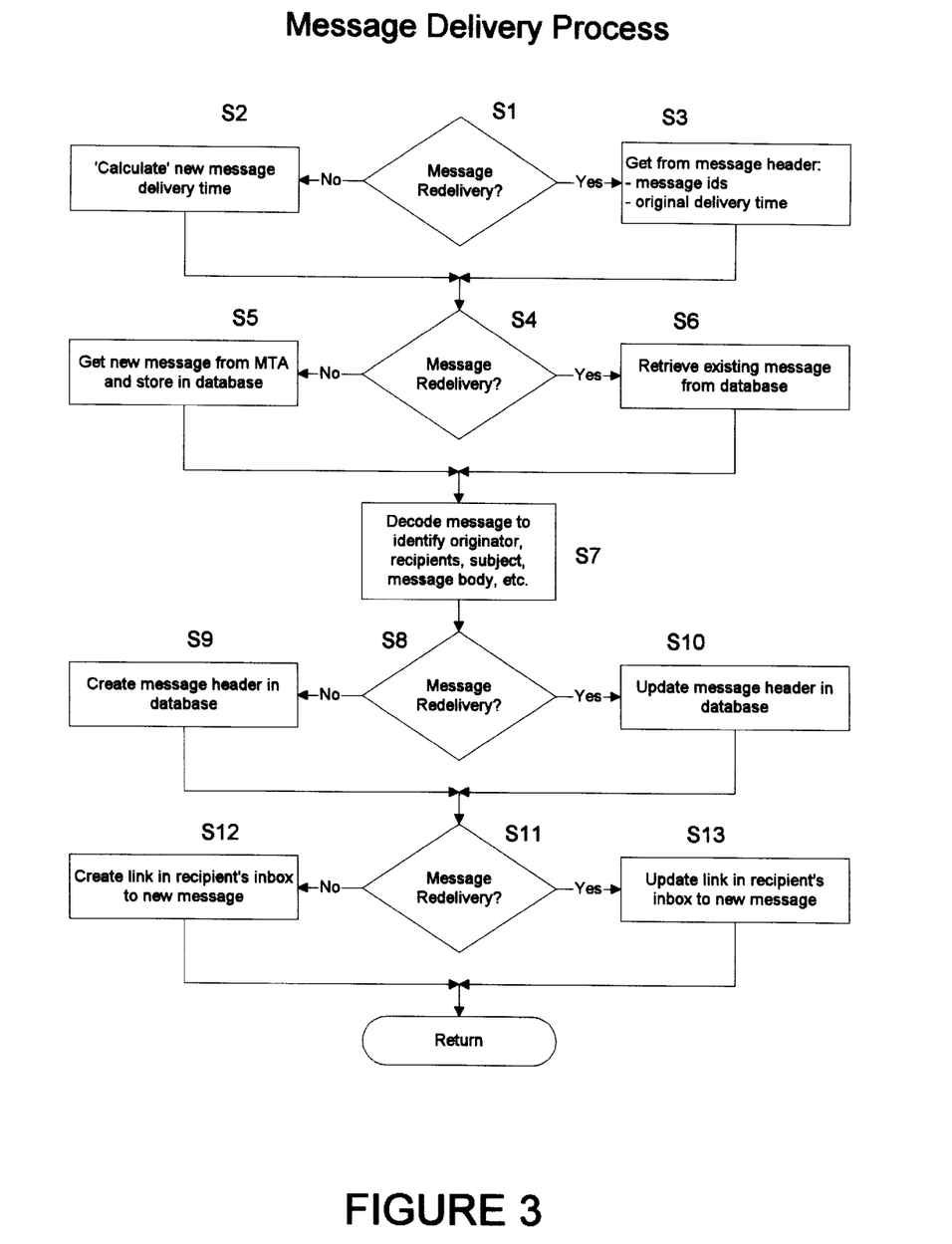
FIG. 3 is a flowchart of a message delivery process integrated with a message redelivery process in accordance with the present invention.

At step S4, the system again determines whether this is a message redelivery process. If not, it retrieves the new message BLOB from the MTA and stores it in the database (step S5). If so, it retrieves the existing message BLOB from the database (step S6).

At step S7, the system decodes the message to identify the originator, recipient(s), subject, message body, etc. This process creates the message attribute tables described above and stores them in the database.

At step S8, the system again determines whether this is a message redelivery process. If not, it creates a message header in the database (step S9). If so, it updates the message header in the database (step S10).

Next, at step S11, the system once again determines whether this is a message redelivery process: If not, it creates a link to the new message in the recipient's inbox (step S12); if so, it updates the link to the new message in the recipient's inbox (step S6). This concludes the message delivery with integrated redelivery process.

Exemplary Message Redelivery Process

Figure 4:
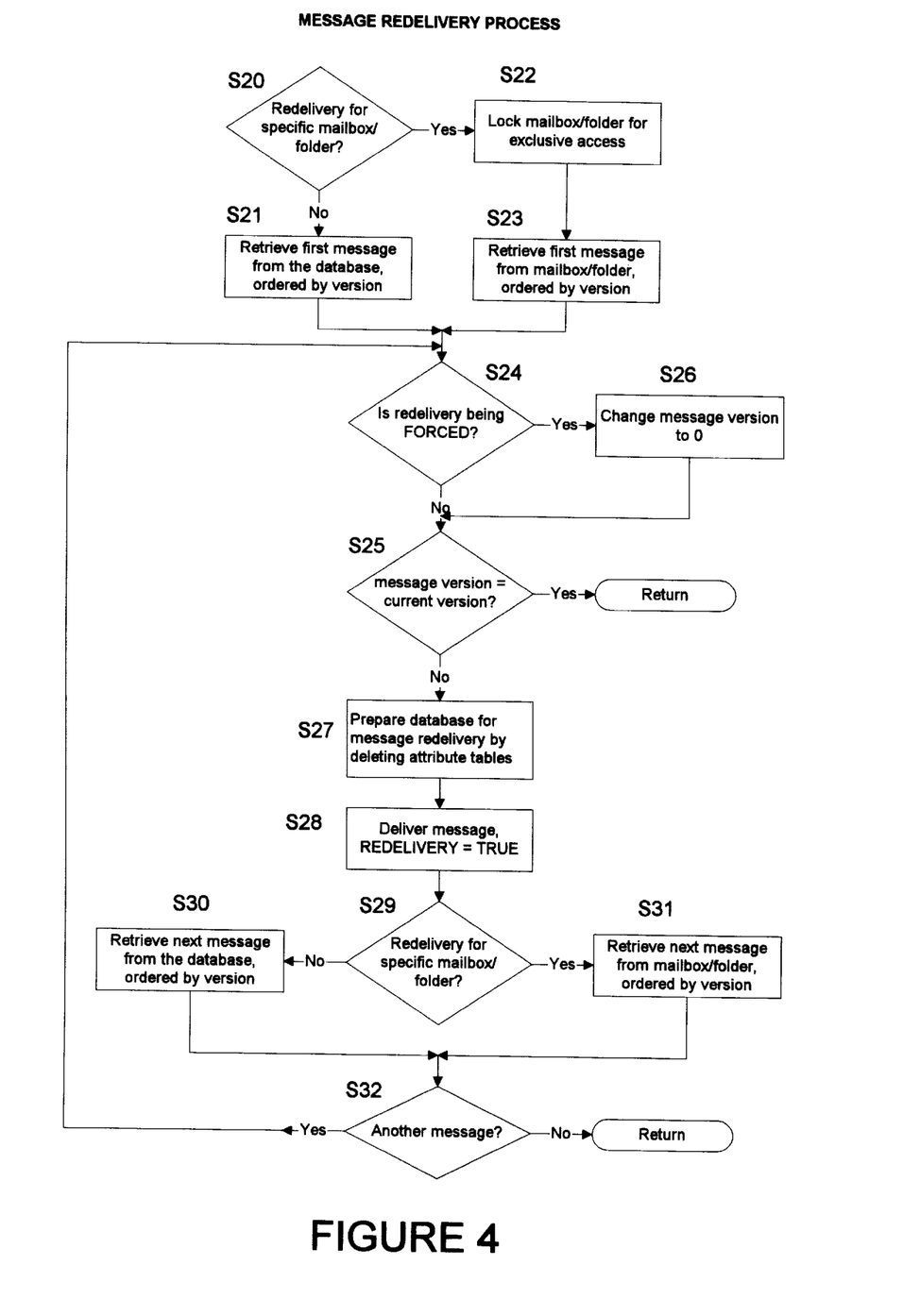
FIG. 4 is a flowchart of a message redelivery process in accordance with the present invention.

An exemplary message redelivery process is shown in FIG. 4. This example begins with step S20, where the system determines whether redelivery is to be carried out for a specific mailbox or folder. If not, the first message is retrieved from the database, ordered by version number (step S21). If so, the specific mailbox or folder is locked such that the redelivery process will have exclusive access to it (step S22), and then the first message is retrieved from the mailbox or folder, ordered by version number (step S23).

Next, at step S24, the system determines whether redelivery is being "forced" (administrator initiated). If not, the process determines whether the message version is equal to the current version (step S25), and if so the process ends. If redelivery is being forced, the message version is set equal to zero (step S26), and so at step S25 (which occurs after S26) the message version will not be equal to the current version, in which case the process continues to step S27.

At step S27, the database is prepared for message redelivery by deleting the existing attribute tables (see above discussion of attributes).

Next, at step S28, the message is delivered, passing the delivery routine a REDELIVERY flag set to TRUE.

At step S29, the system determines again whether redelivery is being performed for a specific mailbox/folder (as in step S20). If not, the next message in the database is retrieved by version number (step S30). If so, the next message in the mailbox or folder is retrieved, again ordered by version number (step S31).

Finally, at step S32, the process determines whether there is another message for redelivery. If so, it loops back to step S24. Otherwise, the process ends (returns).

The scope of protection of the following claims is not intended to be limited to the particulars described above in connection with the detailed description of presently preferred embodiment. For example, the database software may not include a mechanism for retrieving only the records of older versions. In this case, all the message headers could be retrieved to check the message format version. The database software could support an SQL interface that would allow step S20 to request the set of records with the message format version not equal to the current version. The SQL result would indicate whether any messages are of an older version. In addition, only the attributes tables entries that need to be changed would need to be deleted from the database and subsequently added during the delivery process. This could speed up the redelivery function.

I claim:

1. A method for redelivery of messages having an associated message version number and attributes, for use in a messaging system comprising a folder and mailbox database for storing messages, comprising the steps of:

determining whether redelivery is to be carried out for a specific mailbox or folder;

if redelivery is not to be carried out for a specific mailbox or folder, retrieving a first message from the database, ordered by version number;

if redelivery is to be carried out for a specific mailbox or folder, locking the specific mailbox or folder such that the redelivery process will have exclusive access to it, and then retrieving a first message from the mailbox or folder, ordered by version number;

determining whether redelivery is being specifically requested, or forced, by the mail administrator;

if redelivery is being forced, setting the message version to a number which is different from a current version;

if redelivery is not being forced, determining whether the version of the message is equal to a current version;

if the version of the message is not equal to the current version, preparing the database for message redelivery by deleting attributes associated with said message; and delivering the message.

2. A method as recited in claim 1, further comprising the steps of:

if redelivery is not being performed for a specific mailbox or folder, retrieving a next message in the database by version number; and if redelivery is being performed for a specific mailbox or folder, a next message in the mailbox or folder is retrieved, ordered by version number.

3. A method for use in a messaging system having a database of stored messages, wherein said stored messages include or are associated with corresponding attributes, the desired format of which is subject to change over time, the method comprising the steps of:

(A) determining whether a stored message is formatted in accordance with a current message format prescribed for use in said messaging system; and (B) redelivering said stored message if said stored message is not formatted in accordance with said current format; wherein an effect of said step of redelivering said stored message is to update the format of said message to said current format by modifying the corresponding attributes associated with the message.

4. A message delivery with integrated redelivery method, comprising the steps of:

determining whether a specified message is to be delivered initially or redelivered;

if said message is to be redelivered, retrieving a unique message identifier and original message delivery time from a message header associated with said message, and retrieving said message from a database;

decoding said message to identify various message attributes; and if said message is to be redelivered, updating said message header in the database, and updating a link to the message in a mailbox of the recipient.

* * * * *